(12) United States Patent
Davis et al.

(10) Patent No.: US 11,939,063 B2
(45) Date of Patent: Mar. 26, 2024

(54) RECLINING SEAT

(71) Applicant: Gulfstream Aerospace Corporation, Savannah, GA (US)

(72) Inventors: Allen Davis, Savannah, GA (US); Kerem Caglayan, Savannah, GA (US)

(73) Assignee: GULFSTREAM AEROSPACE CORPORATION, Savannah, GA (US)

( * ) Notice: Subject to any disclaimer, the term of this patent is extended or adjusted under 35 U.S.C. 154(b) by 0 days.

(21) Appl. No.: 17/660,727

(22) Filed: Apr. 26, 2022

(65) Prior Publication Data

US 2023/0339615 A1 Oct. 26, 2023

(51) Int. Cl.
*B64D 11/06* (2006.01)
*B60N 2/22* (2006.01)

(52) U.S. Cl.
CPC .............. *B64D 11/064* (2014.12); *B60N 2/22* (2013.01); *B60N 2/2222* (2013.01); *B64D 11/0642* (2014.12)

(58) Field of Classification Search
CPC ...... B60N 2/2222; B60N 2/891; B60N 2/865; B64D 11/0642; A47C 7/38
See application file for complete search history.

(56) References Cited

U.S. PATENT DOCUMENTS

| 4,419,989 A | 12/1983 | Herbold |
| 2002/0070314 A1 | 6/2002 | Schmidt-Schaeffer |
| 2004/0004383 A1 | 1/2004 | Laurent |
| 2006/0185089 A1 | 8/2006 | Davis et al. |
| 2006/0225212 A1 | 10/2006 | Parson et al. |
| 2010/0201167 A1* | 8/2010 | Wieclawski ......... B60N 2/2222 297/284.3 |
| 2012/0074751 A1 | 3/2012 | De La Garza et al. |
| 2015/0136904 A1 | 5/2015 | Savard et al. |
| 2018/0222350 A1* | 8/2018 | Hirayama .............. B60N 2/995 |
| 2019/0225177 A1* | 7/2019 | Gumprecht ....... B60R 21/23138 |
| 2019/0283882 A1* | 9/2019 | Wilcynski .......... B64D 11/0642 |
| 2019/0359105 A1* | 11/2019 | Kondo ................... B60N 2/853 |
| 2020/0001757 A1 | 1/2020 | Son |
| 2020/0047890 A1 | 2/2020 | Simpson et al. |
| 2021/0030161 A1 | 2/2021 | Henshaw |

FOREIGN PATENT DOCUMENTS

| CA | 2980581 A1 | 3/2018 | |
| CN | 101817320 A * | 9/2010 | |
| CN | 111184369 A * | 5/2020 | |
| CN | 113263966 A * | 8/2021 | |
| DE | 6608216 U | 7/1971 | |
| DE | 3829470 C1 * | 10/1989 | |
| DE | 10064794 A1 * | 6/2002 | ............... B60N 2/22 |
| DE | 102019108662 A1 * | 10/2020 | |
| DE | 202022103516 U1 * | 10/2022 | |

(Continued)

*Primary Examiner* — Timothy J Brindley
(74) *Attorney, Agent, or Firm* — LKGLOBAL | Lorenz & Kopf, LLP

(57) ABSTRACT

A reclining seat including, but not limited to, a seat bottom. The reclining seat further including, but not limited to, a seat back having an upper segment and a lower segment, the lower segment pivotally coupled with the seat bottom via a first pivotal coupling, and the upper segment pivotally coupled with the lower segment via a second pivotal coupling.

18 Claims, 7 Drawing Sheets

(56) References Cited

FOREIGN PATENT DOCUMENTS

| EP | 2233346 A2 | * | 9/2010 | ........... B60N 2/0232 |
|----|------------|---|--------|------------------------|
| EP | 3369613 A1 | * | 9/2018 | ............ B60N 2/002 |
| EP | 4036009 A1 |   | 8/2022 | |
| FR | 2923770 A3 | * | 5/2009 | ........... B60N 2/2222 |
| GB | 2433433 A  |   | 6/2007 | |
| JP | 2010095178 A | * | 4/2010 | |
| KR | 20190041205 A |   | 4/2019 | |
| KR | 20190142969 A | * | 12/2019 | |
| KR | 102088844 B1 | * | 3/2020 | |
| KR | 102229901 B1 |   | 3/2021 | |
| KR | 102318752 B1 | * | 10/2021 | |
| KR | 20220167934 A |   | 12/2022 | |
| WO | WO-0069671 A1 | * | 11/2000 | ........... B60N 2/0284 |
| WO | WO-2009004972 A1 | * | 1/2009 | ............... A47C 7/38 |
| WO | WO-2015049937 A1 | * | 4/2015 | ........... B60N 2/2222 |
| WO | 2023041729 A1 |   | 3/2023 | |

\* cited by examiner

RECLINING SEAT

TECHNICAL FIELD

The present invention relates to reclining seats and more particularly relates to reclining seats that are configured to permit a set occupant to maintain a field of view forward of the reclining seat without strain or effort while the reclining seat is reclined.

BACKGROUND

A conventional reclining seat has a seat bottom that is configured to support a posterior of a human occupant (a bottom or buttocks of the human occupant) and a seat back that is configured to support the occupant's back (the rear of the occupant's torso). The seat back is pivotally coupled with the seat bottom. As the seat back reclines from an upright position, the occupant's field of view tilts upwards. When the seat back reaches the limit of its range of motion with respect to the seat bottom, the occupant's field of view may be directed towards the ceiling.

This is a perfectly acceptable view if the seat occupant is trying to rest or sleep. However, if the seat occupant is engaging in an activity that requires him or her to look in a forward direction, for example, to watch television or to play a video game or to read a book or to talk to others, then the seat occupant will either need to strain the upper portion of his/her torso and/or neck to see what he/she is trying to look at, or the seat occupant will need to position pillows, cushions, or other supportive accessories under his/her head to permit his/her field of view to be oriented in a direction forward of the reclining seat.

In addition, when the reclining seat is reclined, there is often a gap between the back of the occupant's neck and the portion of the reclining seat that is longitudinally aligned with the occupant's neck. This lack of support can cause the occupant discomfort or strain.

Accordingly, it is desirable to provide a reclining seat that addresses the concerns expressed above. Furthermore, other desirable features and characteristics will become apparent from the subsequent summary and detailed description and the appended claims, taken in conjunction with the accompanying drawings and the foregoing technical field and background.

BRIEF SUMMARY

Various embodiments of a reclining sear are disclosed herein.

In a first non-limiting embodiment, the reclining seat includes, but is not limited to, a seat bottom. The reclining seat further includes, but is not limited to, a seat back having an upper segment and a lower segment. The lower segment is pivotally coupled with the seat bottom via a first pivotal coupling. The upper segment is pivotally coupled with the lower segment via a second pivotal coupling.

In another non-limiting embodiment, the reclining seat includes, but is not limited to, a seat bottom. The reclining seat further includes, but is not limited to, a seat back having an upper segment and a lower segment. The lower segment is pivotally coupled with the seat bottom via a first pivotal coupling. The upper segment is pivotally coupled with the lower segment via a second pivotal coupling. The upper segment extends for a length that is configured to support both a shoulder and a head of a seat occupant. The reclining seat still further includes, but is not limited to, a neck support that is coupled with the upper segment. The neck support is configured to selectively move transversely with respect to the upper segment between a retracted position and an extended position.

BRIEF DESCRIPTION OF THE DRAWINGS

The present invention will hereinafter be described in conjunction with the following drawing figures, wherein like numerals denote like elements.

DETAILED DESCRIPTION

Figure 1:
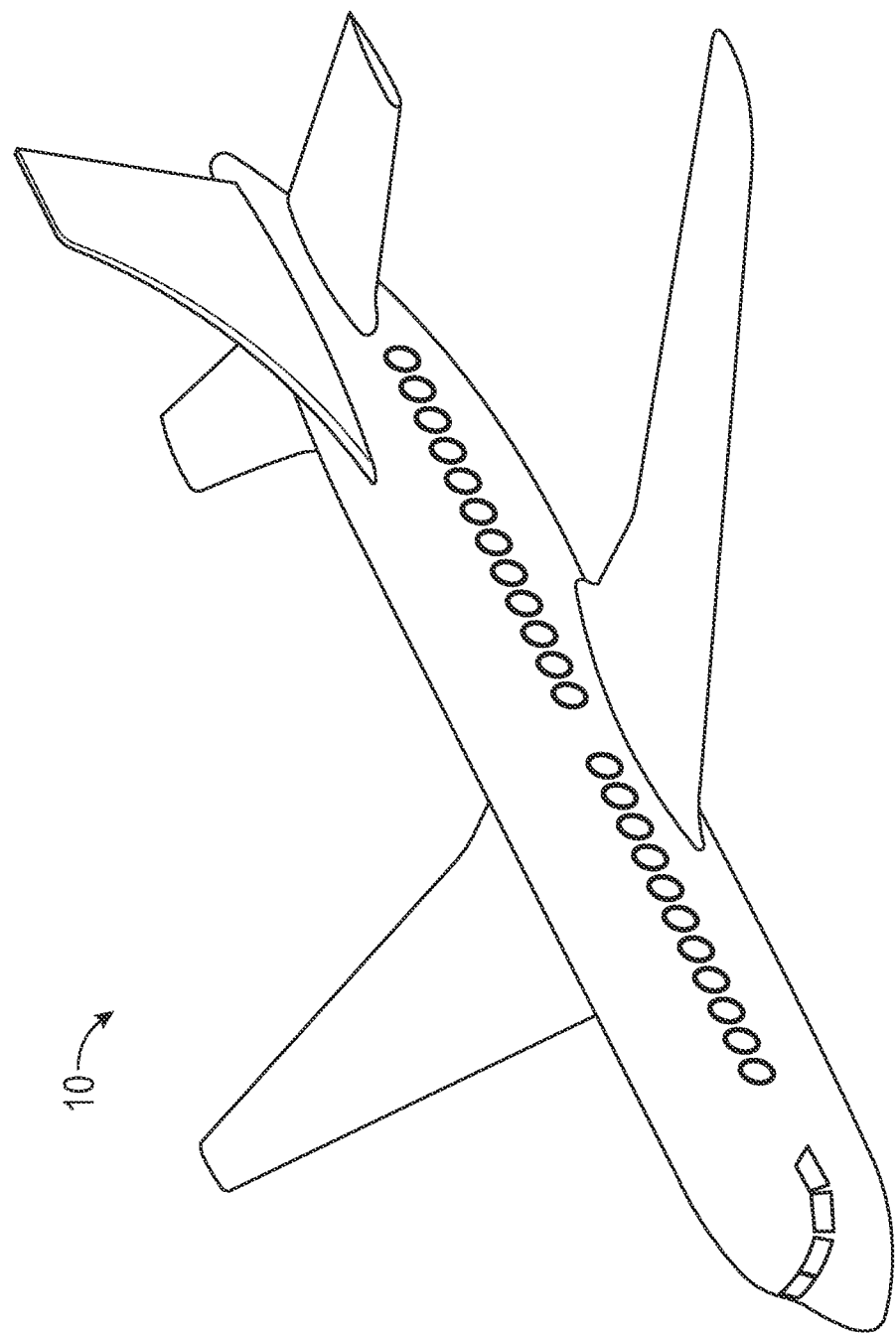
FIG. 1 is a perspective view of a vehicle suitable for use with a reclining seat of the present disclosure.

The following detailed description is merely exemplary in nature and is not intended to limit the invention or the application and uses of the invention. Furthermore, there is no intention to be bound by any theory presented in the preceding background or the following detailed description.

An improved reclining seat is disclosed herein. In an embodiment, the reclining seat of the present disclosure addresses the concerns expressed in the Background of this disclosure by dividing the seat back longitudinally into two segments, a lower segment and an upper segment and by pivotally coupling the upper segment to the lower segment. Further, the pivotal coupling is configured to permit the upper segment to selectively incline with respect to the lower segment. As used herein, the term "incline", when referring to the upper segment of the seat back, shall mean an orientation wherein the upper segment, or a portion of the upper segment, has pivoted about the pivotal coupling from a longitudinal orientation that is substantially aligned with the lower segment to a longitudinal orientation that is rotated forward of the lower segment such that the upper segment (or portion thereof) and the lower segment together form an angle that is less than one hundred and eighty degrees.

When the upper segment or portion thereof is inclined with respect to the lower segment, the it is oriented to support the head and upper torso of a seat occupant in a substantially upright orientation. This permits the seat occupant to maintain a field of view directed forward of the reclining seat and substantially parallel to the floor or other surface that is supporting the reclining seat without the occupant needing to strain muscles or exert effort. When supported in this orientation by the upper segment, the seat occupant can watch television, play video games, read a book, talk with companions, or otherwise engage with his/her surroundings and environment while maintaining his/her field of view in a direction that is conducive for such engagement for protracted periods of time without experiencing neck or upper torso discomfort or fatigue.

In addition, in an embodiment, the upper segment further includes a deployable neck support. When additional support for the back of a seat occupant's neck is desired, a seat occupant can selectively deploy the neck support from the upper segment. The neck support deploys in a direction transverse to the upper segment and extends to engage with the back of the seat occupant's neck. The neck support may have a contour that is configured to conform to, and cradle, the back of the seat occupant's neck for added comfort.

Additionally, in an embodiment, to accommodate seat occupants of varying heights and/or to otherwise allow a seat occupant to adjust the elevation at which the neck support provides support to the back of the seat occupant's neck, the neck support is configured to translate longitudinally with respect to the upper segment of the seat back between a low position and a high position. In another embodiment, rather than the neck support translating with respect to the upper segment of the seat back, the upper segment of the seat back may be at least partially nested telescopically within the lower segment of the seat back and may be configured to extend and retract longitudinally to adjust the elevation of the neck support. In such an embodiment, the upper segment may be configured to extend to a fully extended position before it is free to incline with respect to the lower segment. In other embodiments, any other arrangement and/or mechanism that permits the upper segment of the seat back to extend and retract longitudinally with respect to the lower segment may also be employed without departing from the teachings of the present disclosure.

A greater understanding of the reclining seat discussed above may be obtained through a review of the illustrations accompanying this application together with a review of the detailed description that follows.

FIG. 1 is a perspective view of a vehicle 10 suitable for use with embodiments of a reclining seat 20 (see FIG. 2) disclosed herein. In the illustrated embodiment, vehicle 10 is depicted as aircraft. While the reclining seat disclosed herein is compatible for use onboard an aircraft, it should be understood that the application of the disclosed reclining seat is not limited to such use. Rather, the reclining seat disclosed herein is compatible with all types of vehicles including, but not limited to, automobiles, busses, recreational vehicles, trains, watercraft, spacecraft, and the like. It should be further understood that embodiments of the reclining seat disclosed herein may be employed in applications other than on or in vehicles. For example, and without limitation, embodiments of the reclining seat disclosed herein may be used in home furniture applications, in outdoor furniture applications, in arenas, in stadiums, in theaters, and in other public venues, and in any other application where people might sit in a reclined position. Further, although the embodiment of the reclining seat illustrated herein has been depicted as a single reclining seat designed to accommodate a single seat occupant, it should be understood that the teachings of the present disclosure are applicable to multi-occupant seating accommodations as well.

Figure 2:
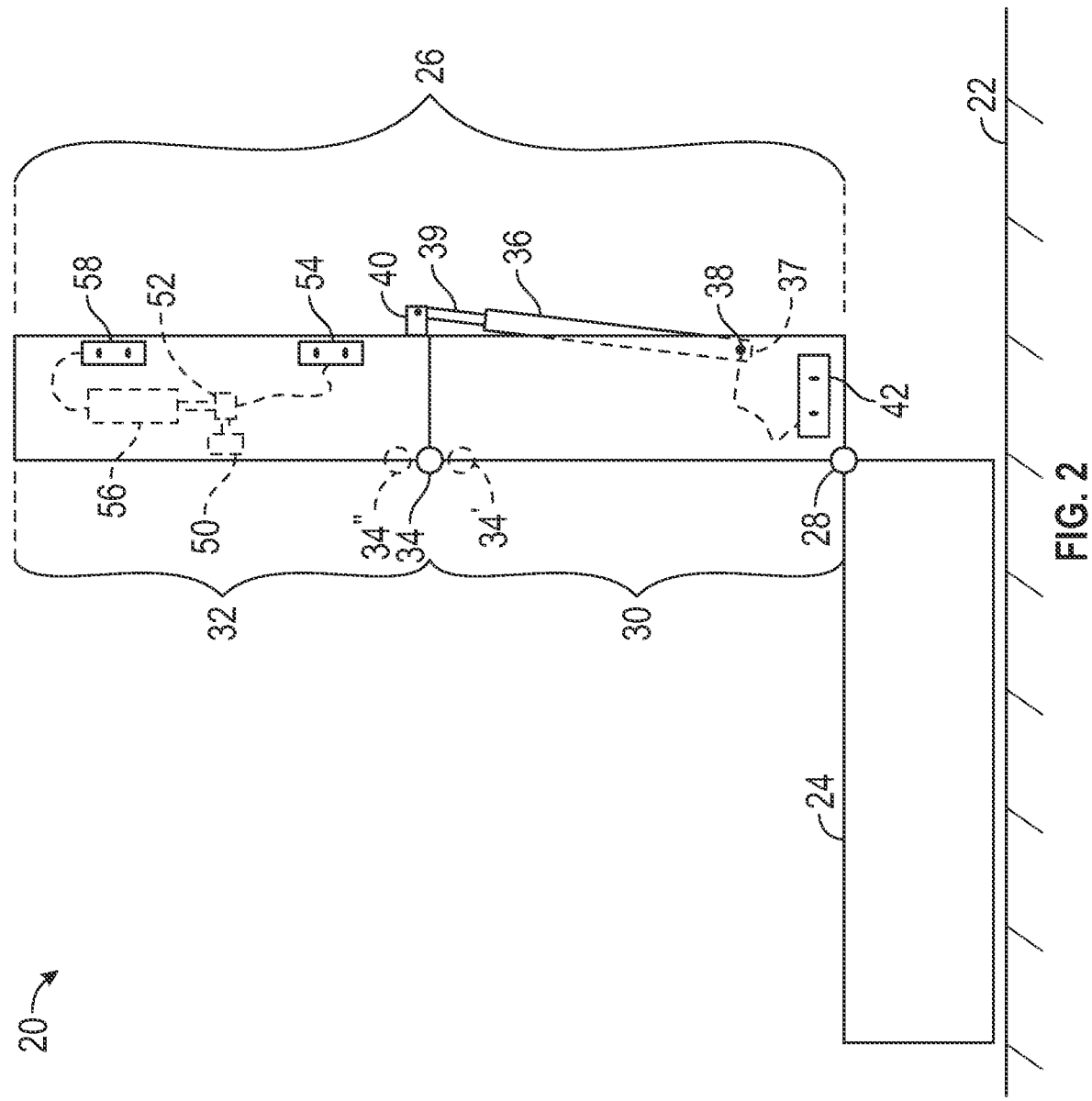
FIG. 2 is a schematic side view illustrating a non-limiting embodiment of a reclining seat made in accordance with the teachings of the present disclosure.

With continuing reference to FIG. 1, FIG. 2 is a schematic side view illustrating a non-limiting embodiment of reclining seat 20 made in accordance with the teachings of the present disclosure. As illustrated in FIG. 2, reclining seat 20 is disposed above a floor surface 22. Support structures supporting reclining seat 20 on floor surface 22 are not relevant to the teachings of the present disclosure and have been omitted for purposes of simplification. It should be understood that the teachings of the present disclosure are compatible with any suitable support structure configured to couple, engage, or otherwise support reclining seat 20 on floor surface 22.

Reclining seat 20 includes a seat bottom 24. Seat bottom 24 is configured to support the posterior of a human occupant of reclining set 20. In a non-limiting embodiment, seat bottom 24 may comprise a rigid support structure such as a seat frame (not shown) supporting a cushion body such as a foam cushion (not shown) and an upholstery layer such as a leather material (not shown) disposed over and around the cushion. In such an embodiment, the rigid support structure would provide primary structural support for the seat bottom 24 and may further include attachment points to permit seat bottom 24 to be coupled to other structural elements of reclining seat 20 such as, but not limited to, a base that is configured to support reclining seat 20 on floor surface 22.

Reclining seat 20 further includes a seat back 26. Seat back 26 is configured to support the back of the human occupant of reclining seat 20. As with seat bottom 24, seat back 26 may also comprise a rigid support structure such (not shown) supporting a cushion (not shown) and an upholstery layer (not shown) disposed over and around the cushion. In such an embodiment, the rigid support structure would provide primary structural support for seat back 26 and may further include attachment points to permit seat back 26 to be coupled to seat bottom 24.

In the illustrated embodiment, seat back 26 is pivotally coupled with seat bottom 24 via a pivotal coupling 28. Pivotal coupling 28 may comprise any structure, device or mechanism that is effective to permit seat back 26 to rotate with respect to seat bottom 24. In the illustrated embodiment, pivotal coupling 28 permits seat back 26 to recline (pivot in a clockwise direction from the perspective of FIG. 2) with respect to seat bottom 24. In an embodiment, the reclining motion of seat back 26 may be controlled manually by a human seat occupant through the selective release or engagement of a release lever (not shown). In another embodiment, such reclining motion may be controlled by a human occupant through the selective actuation of an actuator (e.g., a motorized linear actuator) configured to control pivotal movement of seat back 26 with respect to seat bottom 24.

Seat back 26 includes a lower segment 30 and an upper segment 32 pivotally coupled to one another via pivotal coupling 34. As illustrated, pivotal coupling 34 is disposed at a forward-most portion of seat back 26. In another embodiment, pivotal coupling 34 may be positioned at a forward-most portion of a rigid support structure of lower segment 30 and a forward-most portion of a rigid support structure of upper segment 32. In such a configuration, pivotal coupling 34 may be disposed beneath a layer of cushion and beneath a layer of upholstery to provide added comfort to a seat occupant. By positioning pivotal coupling 34 at a forward portion of lower segment 30 and a forward portion of upper segment 32, upper segment 32 is permitted to incline (e.g., pivot in a counter-clockwise direction from the perspective of FIG. 2) with respect to lower segment 30, as discussed in detail later.

In the illustrated embodiment, lower segment 30 comprises approximately sixty-two and half percent of the total longitudinal length of seat back 26. In other embodiments, lower segment 30 may have a longitudinal length ranging between sixty percent and sixty five percent of the total longitudinal length of seat back 26, as indicted by the illustrations of pivotal coupling 34' and pivotal coupling 34", respectively, both drawn in phantom. Correspondingly, upper segment 32 has a longitudinal length of thirty-seven and a half percent of the total longitudinal length of seat back 26. In the alternate embodiments represented by pivotal couplings 34' and 34", upper segment 32 would have a longitudinal length ranging between forty percent and thirty-five percent, respectively of the total longitudinal length of seat back 26. In another non-limiting embodiment, the proportional longitudinal lengths of lower segment 30 and upper segment 32 and the position of pivotal coupling 34 and may be designed to correspond with an approximate shoulder height of a typical seat occupant. In still other embodiment, the proportional longitudinal lengths of lower segment 30 and upper segment 32 and the position of pivotal coupling 34 and may be designed to correspond with an approximate shoulder height of an anticipated seat occupant (e.g., the ratio of longitudinal lengths between lower segment 30 and upper segment 32 may be tailored to accommodate the dimensions of a purchaser of vehicle seat 20). In still other embodiments, the ratio of longitudinal lengths of lower segment 30 to upper segment 32 may be determined in any other suitable manner that is effective to provide a seat occupant with a desired amount of upper torso support.

Lower segment 30 includes an actuator 36 to control the inclining of upper segment 32. In the illustrated embodiment, actuator 36 comprises an electrically motorized linear actuator that is configured to selectively extend and retract along its linear axis when actuated. When actuated, the longitudinal length of actuator 36 will either increase or decrease depending whether the seat occupant's actuation causes extension or retraction, respectively, of actuator 36. Although actuator 36 has been illustrated as a linear actuator in the figures accompanying the present disclosure, it should be understood that any other suitable actuator that is effective to control the inclining of upper segment 32 may be employed without departing from the teachings of the present disclosure. For example and without limitation, actuator 36 may comprise a rotary actuator.

Actuator 36 has a lower end 37 and an upper end 39. Lower end 37 is pivotally coupled to pivot point 38. Pivot point 38 may comprise any suitable attachment point associated with lower segment 30 that is suitable to permit pivotal coupling and that is effective to provide sufficiently robust support to actuator 36 as actuator 36 extends and retracts. In an example, pivot point 38 may be associated with a rigid structural support structure of lower segment 30. Upper end 39 is pivotally coupled to attachment point 40. Attachment point 40 may be any suitable attachment point associated with upper segment 32 that is sufficient to permit pivotal coupling and that is effective to provide sufficiently robust support to actuator 36 as actuator 36 extends and retracts. In the illustrated embodiment, attachment point 40 is disposed on a rear-most portion of upper segment 32. In another embodiment, attachment point 40 may be disposed on a rear-most portion of a rigid support structure of on upper segment 32. In still other embodiments, attachment point 40 may be disposed at any position on upper segment 32 that is disposed to the rear of pivotal coupling 34 (from the perspective of FIG. 2, "to the rear" would be to the right of pivotal coupling 34).

Lower segment 30 further includes a user input 42. User input 42 may be any component suitable to receive inputs from an occupant of reclining seat 20. For example, and without limitation, user input 42 may be a keyboard, a mouse, a touch screen, a tablet and stylus, a button, a switch, a knob, a slide, a microphone, a camera, a motion detector, or any other device that is configured to permit a human to provide inputs into an electronic device. In other embodiments, user input 42 may be a self-contained or independent system, such as a mobile device that is physically separate from reclining seat 20. In some embodiments, user input 42 may be dedicated for use exclusively with reclining seat 20 while in other embodiments user input 42 may be shared with other systems on board vehicle 20.

In the illustrated embodiment, user input 42 comprises a plate with two depressible buttons. User input 42 is operatively coupled with actuator 36 and is configured to actuate actuator 36 to either extend or retract in a manner that corresponds with which button has been depressed. When user input 42 is used to actuate actuator 36 to extend, actuator 36 will extend and, in turn, it will push in an upwards direction on attachment point 40 causing upper segment 32 to pivot in a counterclockwise direction (from the perspective of FIG. 2) about pivotal coupling 34. This counterclockwise pivotal movement of upper segment 32 will cause upper segment 32 to incline with respect to lower segment 30 and to form an angle therewith of less than one hundred eighty degrees. The seat occupant may continue extending actuator 36 until his/her head and upper torso have reached a desired orientation or until actuator 36 has fully extended. When user input 42 is used to actuate actuator 36 to retract, actuator 36 will retract and, in turn, it will pull on attachment point 40. Pulling on attachment point 40 will cause upper segment 32 to pivot in a clockwise direction (from the perspective of FIG. 2) about pivotal coupling 34, thereby causing upper segment 32 to decline with respect to lower segment 30. The seat occupant may continue such clockwise pivotal motion until upper segment 32 has reached a new desired orientation or until actuator 36 has reached the limit of its range of travel and lower segment 30 are aligned and form an angle of approximately one hundred eighty degrees. In some embodiments, actuator 36 may be configured to pull upper segment 32 further clockwise beyond the point where upper segment 32 and lower segment 30 are aligned with one another at one hundred and eighty degrees.

Upper segment 32 includes a neck support 50, an actuator 52, a user input 54, an actuator 56, and a user input 58. In other embodiments, a greater or lesser number of components may be employed without departing from the teachings of the present disclosure.

Neck support 50 may comprise any suitable structure that is configured to engage with, and to support, the back portion of a seat occupant's neck. In some embodiments, neck support 50 may comprise a cushioned body which may contribute to occupant comfort when neck support 50 is engaged with an occupant's neck. In an embodiment, upper segment 32 may include an opening in its forward facing surface to permit the outward extension of neck support 32 from a retracted position where it is concealed to an extended position where it may engage with the seat occupant's neck. In another embodiment, upper segment 32 may have a deformable outer layer of upholstery. In such an embodiment, neck support 50 may push outwardly on such deformable upholstery layer when engaging with the neck of a seat occupant while remaining behind such deformable upholstery layer at all times regardless of its state of extension. As illustrated in FIG. 2, neck support 50 is disposed in the retracted position.

Actuator 52 is configured to control movement of neck support 50 between the retracted position and the extended position. In the illustrated embodiment, actuator 52 is depicted as a linear actuator but it should be understood that any other suitable type of actuator that is effective to move neck support 50 between the retracted position and the extended position may be employed. For example, and without limitation, actuator 52 may comprise a scissor actuator. Actuator 52 may be mounted to any suitable structure of upper segment of 32 that is suitable for providing support to actuator 52 as it moves neck support 50 between the retracted and extended position. In an example, actuator 50 may be mounted to a rigid support structure of upper segment 32.

User input 54 may comprise any suitable input device as described above with respect to user input 42. In the illustrated embodiment, user input 54 comprises a plate with two depressible buttons. User input 54 is operatively coupled with actuator 52 and is configured to actuate actuator 52 to either extend or retract in a manner that corresponds with which button of user input 54 has been depressed. When user input 54 is used to actuate actuator 52 to extend, actuator 52 will extend and push forward on (i.e., in a leftward direction from the perspective of FIG. 2) neck support 50 causing neck support 50 to move from a retracted position to an extended position where it may engage with a seat occupant's neck. When user input 54 is used to actuate actuator 52 to retract, actuator 52 will retract and, in turn, it will pull on neck support 50 and move it from the extended position to the retracted position. In this manner, an occupant of reclining seat 20 may use user input 54 to obtain a desired amount of support for the back of his/her neck from neck support 50.

Actuator 56 is configured to control translation of neck support 50 between a low position and a high position. In the illustrated embodiment, translation of neck support 50 is accomplished through translation of actuator 52. In another embodiment, actuator 56 may be configured to directly translate neck support 50. In the illustrated embodiment, actuator 56 is depicted as a linear actuator, but it should be understood that any other suitable type of actuator that is effective to translate neck support 50 between the low position and the high position may be employed. Actuator 56 may be mounted to any suitable structure of upper segment of 32 that is suitable for providing support to actuator 56 as it translates actuator 52 and neck support 50 between the low position and high position. In an example, actuator 50 may be mounted to a rigid support structure of upper segment 32.

User input 58 may comprise any suitable input device as described above with respect to user input 42. In the illustrated embodiment, user input 58 comprises a plate having two depressible buttons. User input 58 is operatively coupled with actuator 56 and is configured to actuate actuator 56 to either extend or retract in a manner that corresponds with which button of user input 58 has been depressed. When user input 58 is used to actuate actuator 56 to retract, actuator 62 will retract and, in turn, it will pull in an upward direction (from the perspective of FIG. 2) on actuator 52 and neck support 50 causing neck support 50 to translate from a low position to a high position. When user input 58 is used to actuate actuator 56 to extend, actuator 56 will extend and, in turn, it will push on actuator 52 and neck support 50 and move it from the high position to the low position. In this manner, an occupant of reclining set 20 may use user input 58 to adjust the height of neck support 50 to position neck support 50 in a position that provides a desired amount of comfort.

Figure 3:
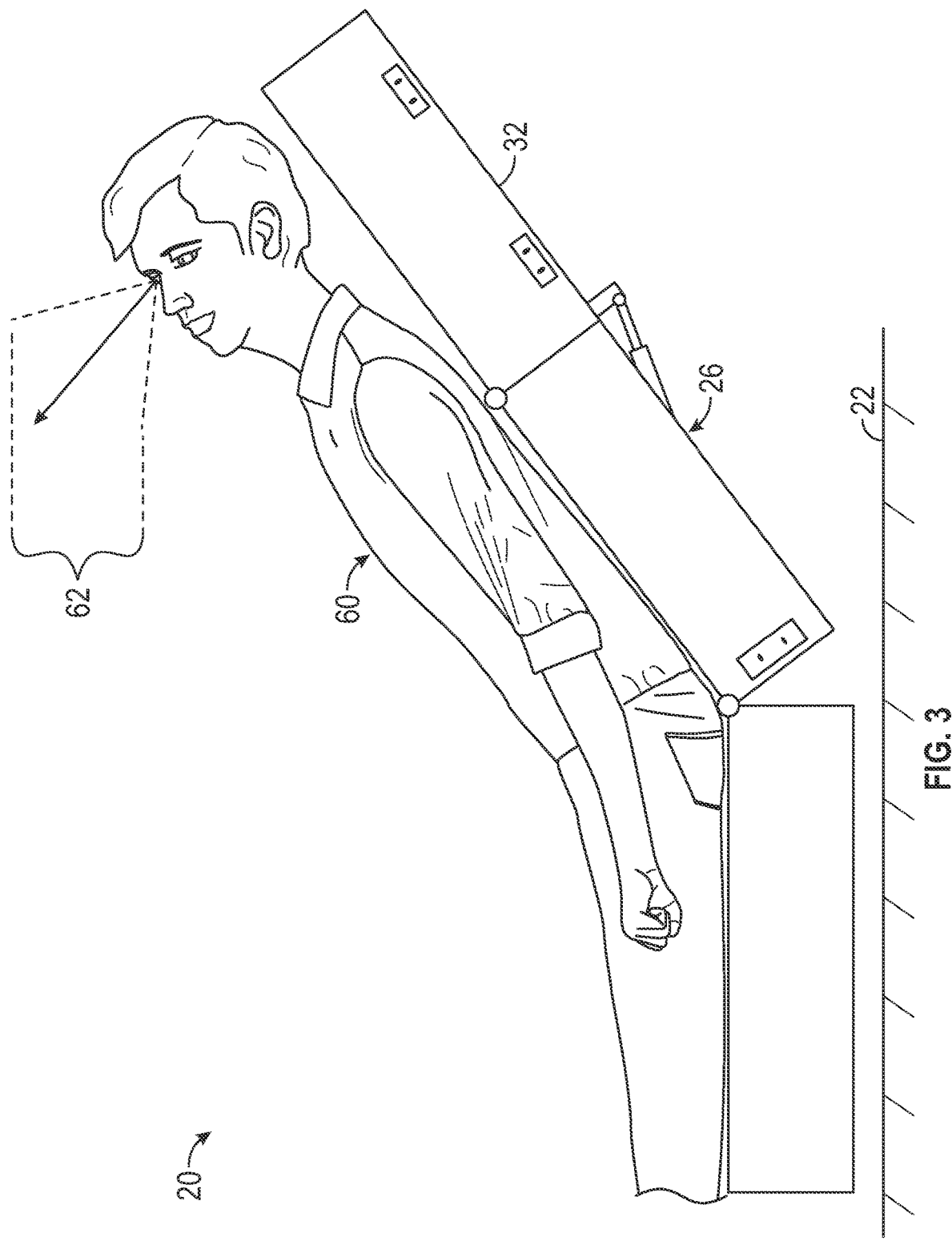
FIG. 3 is a schematic side view illustrating the reclining seat of FIG. 2 with a seat back in a reclined orientation.

With continuing reference to FIGS. 1-2, FIG. 3 is a schematic side view illustrating reclining seat 20 with seat back 26 in a reclined orientation. As illustrated in FIG. 3, an occupant 60 seated in reclining seat 20 while it is reclined would have a field of view 62 that is canted at an angle with respect to floor surface 22. In an example, field of view 62 would provide occupant 60 with a view of a ceiling surface. This may be ideal if occupant 60 is attempting to sleep or rest. However, if occupant 60 intends to participate in an activity that requires him/her to look in a direction forward of reclining seat 20, occupant 60 will need to strain his/her neck to look in that direction.

Figure 4:
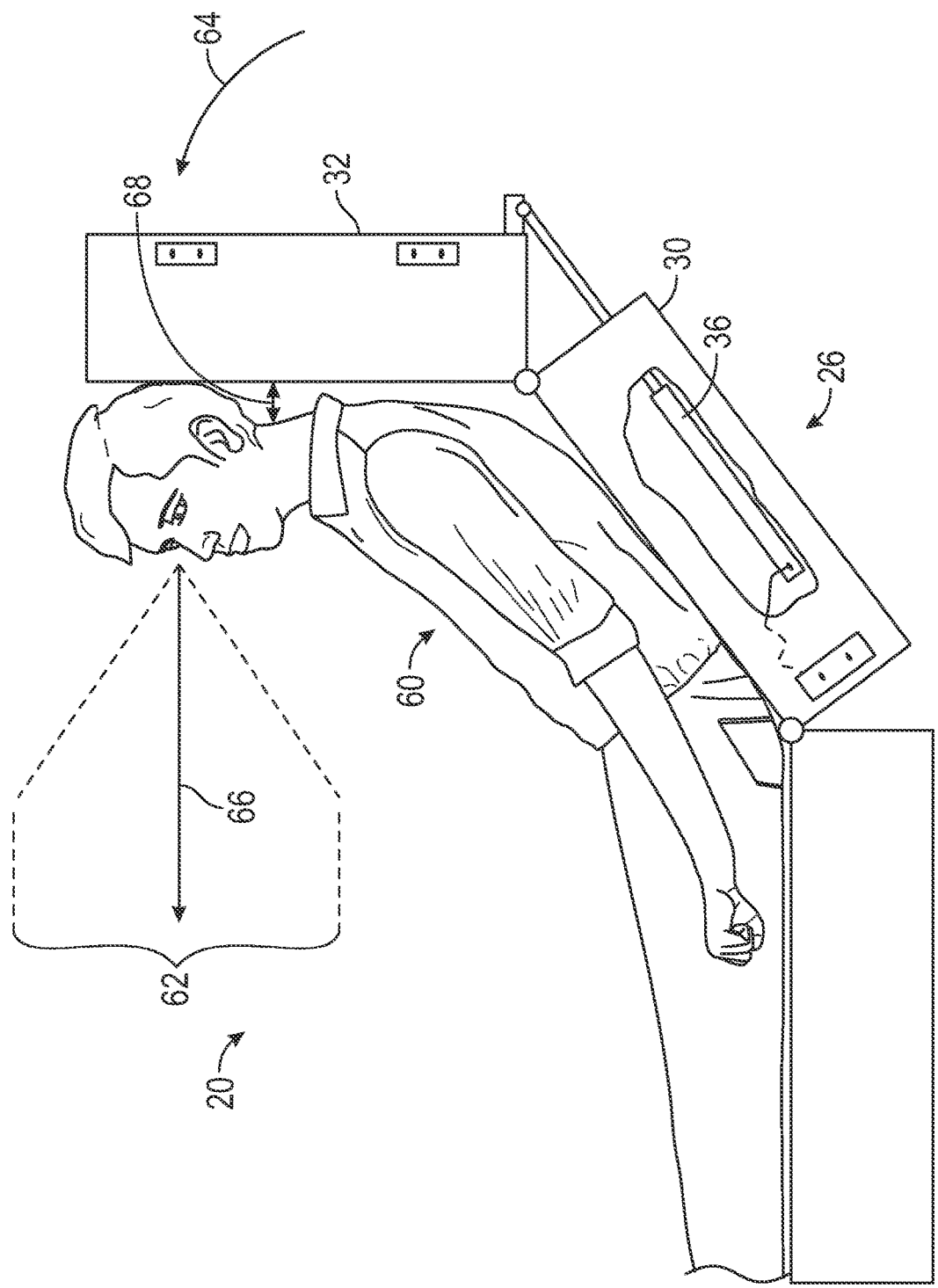
FIG. 4 is a schematic, partially torn-away, side view illustrating the reclining seat of FIG. 3 with an upper segment of the seat back in an inclined orientation.

With continuing reference to FIGS. 1-3, FIG. 4 is a schematic, partially torn-away side view illustrating reclining seat 20 again with seat back 26 in a reclined orientation. In FIG. 4, however, upper segment 32 is inclined (i.e., upper section 32 has pivoted in the direction indicated by arrow 64). In this view, actuator 36 can be seen in an extended position. As upper segment 32 pivots in the direction indicated by arrow 64, and as actuator 36 extends, actuator 36 also pivots about pivot point 38 to an orientation that is more aligned with a longitudinal axis of lower segment 30.

As illustrated in FIG. 4, upper segment 32 has pivoted to an extent that directs field of view 62 in an orientation such that a central axis 66 of field of view 62 is now aligned with (i.e., substantially parallel to) floor surface 22. When inclined as illustrated in FIG. 4, upper segment 32 supports both the head and upper torso of seat occupant 60 in an orientation that permits seat occupant 60 to engage with people and/or objects located forward of reclining seat 20 without requiring seat occupant 60 to strain any muscles to maintain the illustrated orientation.

As indicated by arrow 68, when seat occupant 60 is reclined in reclining seat 20 with upper segment 32 in the inclined position, a gap remains between the back of the neck of seat occupant 60 and a forward-most surface of upper segment 32. The presence of this gap may comprise a source of some discomfort or strain for seat occupant 60.

Figure 5:
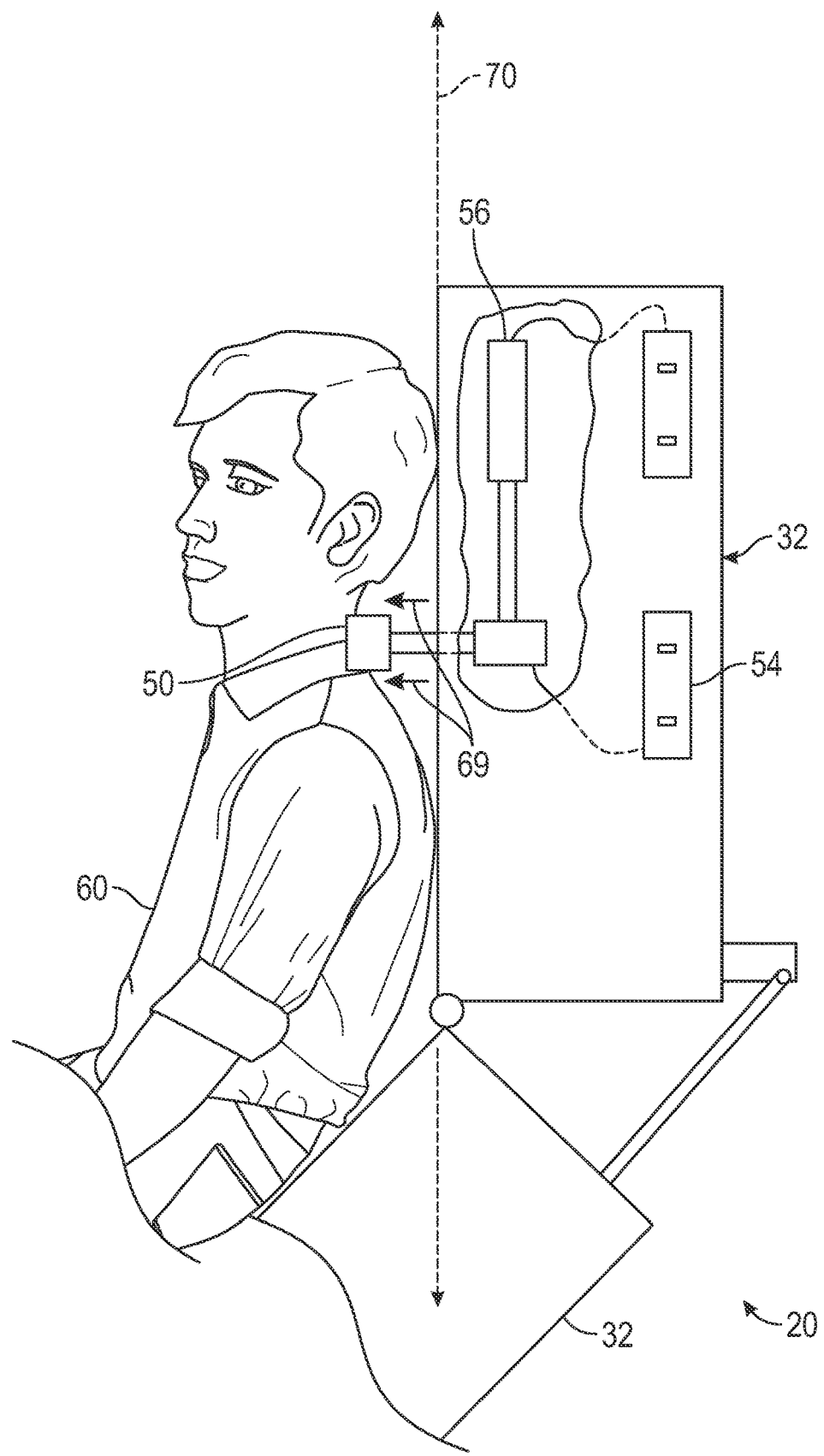
FIG. 5 is an expanded, schematic, partially torn-away, side view illustrating the upper segment of the seat back of FIG. 4 with a neck support in an extended position at a low longitudinal location along the upper segment.

With continuing reference to FIGS. 1-4, FIG. 5 is an expanded schematic torn-away side view illustrating upper segment 32 in the inclined position. As illustrated in FIG. 5, neck support 50 has moved in the direction indicated by arrows 69 and is now disposed in the extended position and is also positioned at a low position along a longitudinal axis of upper segment 32. With neck support 50 disposed in an extended position, neck support 50 now protrudes beyond an imaginary plane 70 that extends between a forward-facing upper surface of upper segment 32 and a forward-facing lower surface of upper segment 32.

As illustrated in FIG. 5, neck support 50 has been extended to an extent whereby it engages with a back of the neck of occupant 60. This engagement between neck support 50 and the back of the neck of seat occupant 60 provides occupant 60 with added support, thereby increasing his or her comfort. In an embodiment, occupant 60 may use user input 54 to adjust the extent of outward extension of neck support 50. This will allow occupant 60 to modulate the amount of pressure and/or support provided by neck support 50. As further illustrated in FIG. 5, actuator 56 is disposed in its most extended position which correspondingly places neck support 50 at its lowest longitudinal position. As such, neck support 50 engages with a relatively low portion of the neck of seat occupant 60.

Figure 6:
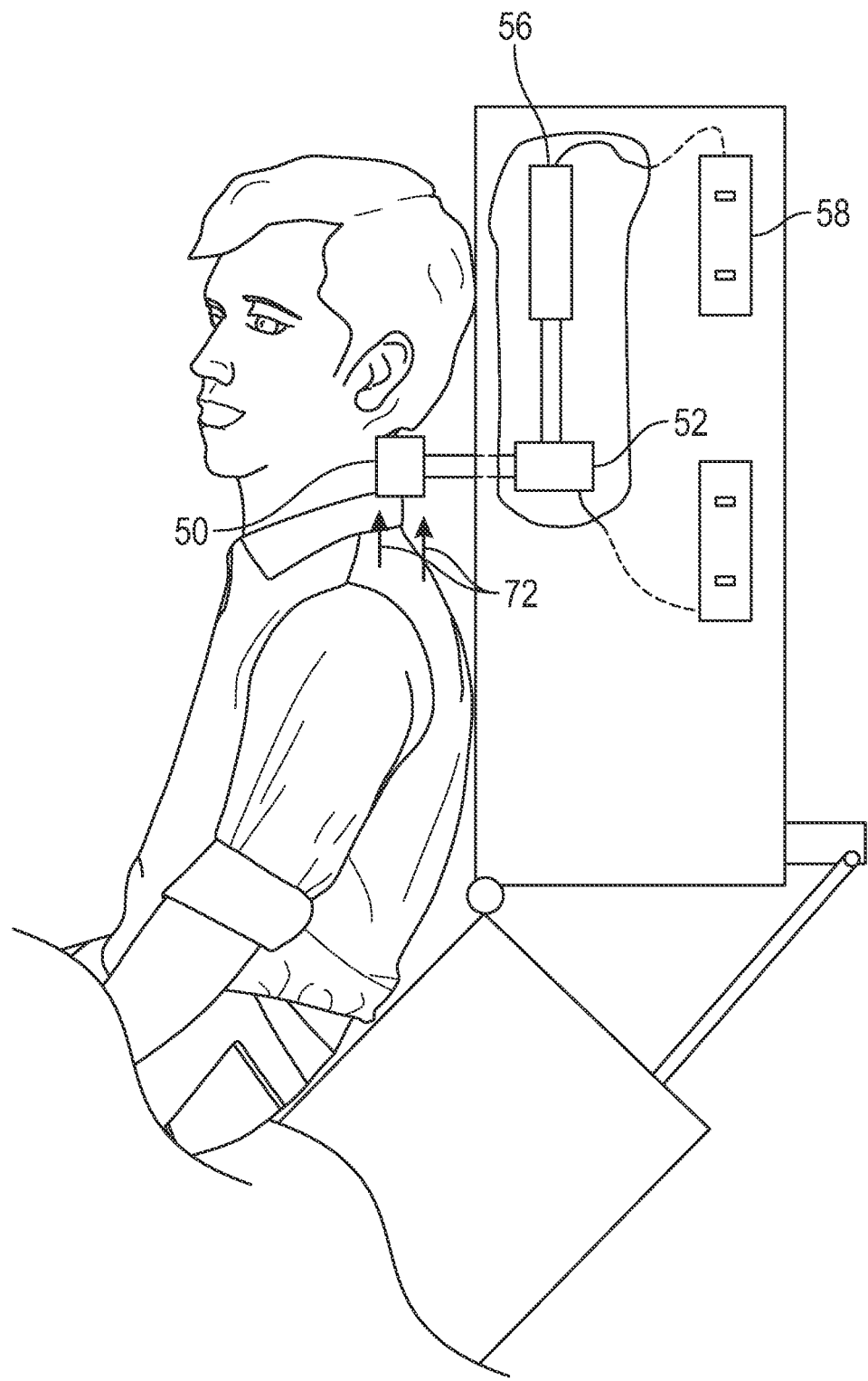
FIG. 6. is an expanded, schematic, torn-away, side view similar to FIG. 5 showing the neck support in an extended position at a high longitudinal location along the upper segment.
Figure 7:
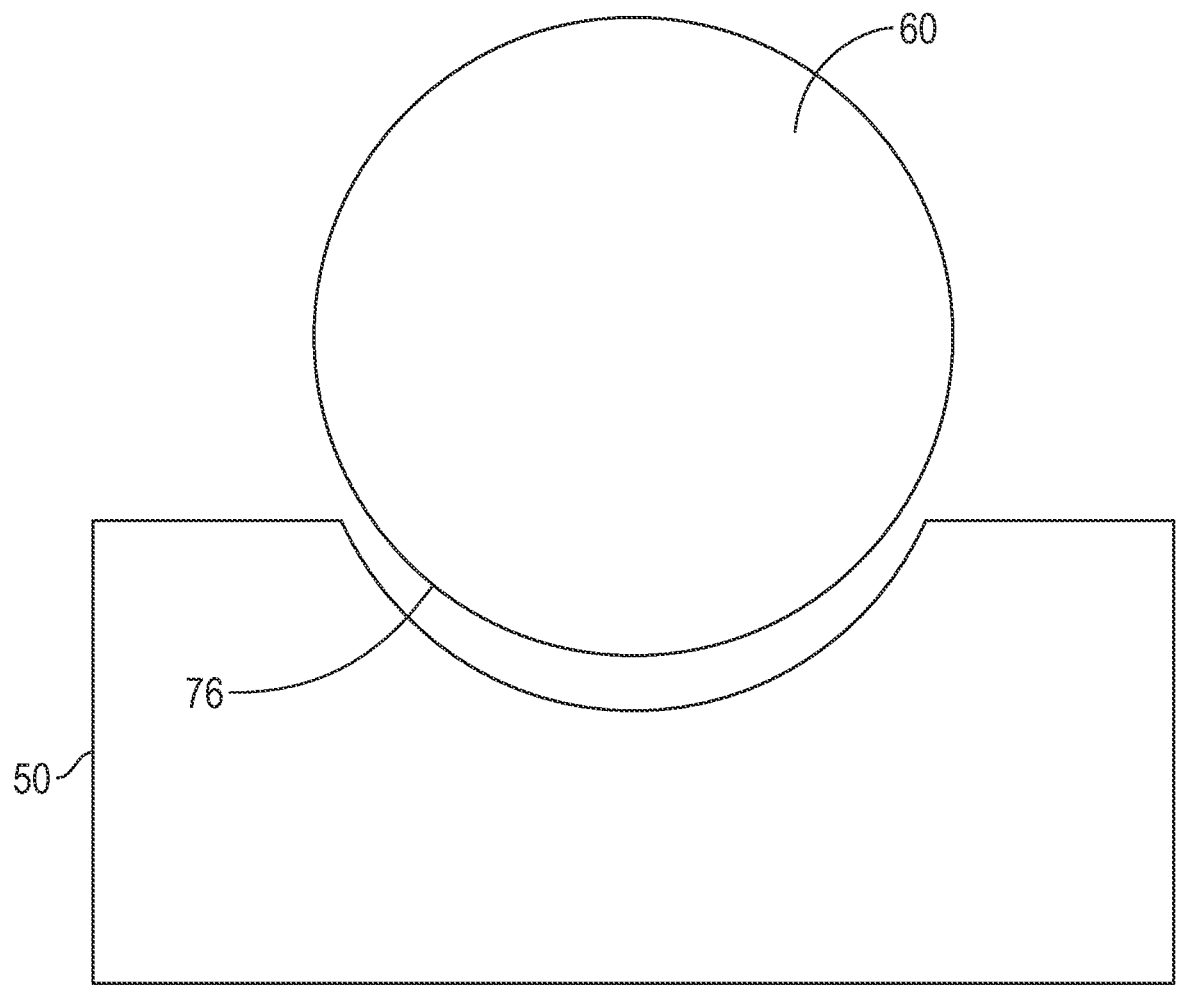
FIG. 7 is a schematic axial view of the neck support of FIGS. 5 and 6.

With continuing reference to FIGS. 1-5, FIG. 6. is an expanded schematic torn-away side view similar to FIG. 5 showing neck support 50 after it has moved from the low position illustrated in FIG. 5 in the direction indicated by arrows 72 to the high position illustrated in FIG. 6. To adjust the height of neck support 50, occupant 60 used user input 58 to actuate actuator 56 in a manner that caused actuator 56 to retract. This shortened the length of actuator 56 and correspondingly adjusted the elevation of actuator 52 which correspondingly adjusted the elevation of neck support 50.

With continuing reference to FIGS. 1-6, FIG. 7 is a schematic axial view of neck support 50. In the illustrated embodiment, neck support 50 has a arcuate depression 74 that is configured to comfortably accommodate a back of a neck 76 of occupant 60. Neck support 50 is a body or a plurality of bodies that may be comprised of any material that is suitable for providing comfortable support to back of neck 76. Further, neck support 50 may have any shape, contour, and/or configuration that is effective to provide such comfortable support. In a non-limiting embodiment, neck support 50 is a compressible cushion comprised of a foam material.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the disclosure as set forth in the appended claims.

What is claimed is:

1. A reclining seat comprising:
a seat bottom;
a seat back having an upper segment and a lower segment, the lower segment pivotally coupled with the seat bottom via a first pivotal coupling, and the upper segment pivotally coupled with the lower segment via a second pivotal coupling; and
an actuator coupled with the lower segment and the upper segment, the actuator configured to selectively incline the upper segment with respect to the lower segment
wherein the second pivotal coupling is disposed at a forward-most portion of a first structural portion of the lower segment, wherein the upper segment includes an attachment point at a rear-most portion of a second structural portion of the upper segment, and wherein the actuator is coupled with the attachment point.

2. The reclining seat of claim 1 wherein the seat back is configured to selectively recline with respect to the seat bottom about the first pivotal coupling and wherein the upper segment is configured to selectively incline with respect to the lower segment about the second pivotal coupling.

3. The reclining seat of claim 2, wherein the seat back is configured to sustain the upper segment in an inclined position with respect to the lower segment at an angle that supports an occupant of the seat in a position that provide the occupant of the seat with a forward looking field of view having a central axis that is substantially parallel to a surface supporting the seat.

4. The reclining seat of claim 1, wherein the actuator comprises a linear actuator.

5. The reclining seat of claim 1, further comprising a first user input device coupled with one of the seat bottom and the seat back and operatively coupled with the actuator, the input device configured to control the actuator to incline the upper segment.

6. The reclining seat of claim 1, wherein the second pivotal coupling is disposed at a location on the seat back that corresponds with a shoulder height of a reclining seat occupant.

7. The reclining seat of claim 1, wherein the lower segment has a first longitudinal length comprising a first range of approximately sixty percent to sixty-five percent of a total longitudinal length of the seat back and wherein the upper segment has a second longitudinal length comprising a second range of approximately forty percent to thirty-five percent, respectively, of the total longitudinal length of the seat back.

8. A reclining seat comprising:
a seat bottom;
a seat back having an upper segment and a lower segment, the lower segment pivotally coupled with the seat bottom via a first pivotal coupling, and the upper segment pivotally coupled with the lower segment via a second pivotal coupling, the upper segment extending for a length that is configured to support both a shoulder and a head of a reclining seat occupant;
an actuator coupled with the lower segment and the upper segment, the actuator configured to selectively incline the upper segment with respect to the lower segment
wherein the second pivotal coupling is disposed at a forward-most portion of a first structural portion of the lower segment, wherein the upper segment includes an attachment point at a rear-most portion of a second structural portion of the upper segment, and wherein the actuator is coupled with the attachment point; and
a neck support coupled with the upper segment, the neck support configured to selectively move transversely with respect to the upper segment between a retracted position and an extended position.

9. The reclining seat of claim 8, wherein the neck support is embedded within the upper segment.

10. The reclining seat of claim 9, wherein the neck support is configured to remain behind an imaginary plane extending between a longitudinal bottom of a forward facing surface of the upper segment and a longitudinal top of the forward facing surface of the upper segment when the neck support is in the retracted position, and
wherein the neck support is configured to protrude beyond the imaginary plane when the neck support is in the extended position.

11. The reclining seat of claim 8, wherein the neck support is configured to provide circumferential support around a circumferential portion of a back portion of a neck of a human occupant of the reclining seat.

12. The reclining seat of claim 8, further comprising a second actuator coupled with the neck support and configured to move the neck support between the extended position and the retracted position.

13. The reclining seat of claim 12, further comprising a second user input coupled with one of the seat bottom and the seat back and operatively coupled with the actuator, the second user input configured to control the actuator to move the neck support between the retracted position and the extended position.

14. The reclining seat of claim 8, wherein the neck support is configured to move longitudinally with respect to the upper segment between a high position and a low position.

15. The reclining seat of claim 14, further comprising a third actuator coupled with the neck support and configured to move the neck support between the high position and the low position.

16. The reclining seat of claim 15, further comprising a third user input coupled with one of the seat bottom and the seat back and operatively coupled with the third actuator, the third user input configured to control the third actuator to move the neck support between the high position and the low position.

17. The reclining seat of claim 8 wherein the seat back is configured to selectively recline with respect to the seat bottom about the first pivotal coupling and wherein the upper segment is configured to selectively incline with respect to the lower segment about the second pivotal coupling.

18. The reclining seat of claim 17, wherein the reclining seat comprises a vehicle seat.

* * * * *